United States Patent [19]

Simonet

[11] 4,155,863
[45] May 22, 1979

[54] SOFT LITHIUM-TITANIUM-ZINC FERRITE

[75] Inventor: William Simonet, Paris, France

[73] Assignee: Thomson-CSF, Paris, France

[21] Appl. No.: 859,714

[22] Filed: Dec. 12, 1977

[30] Foreign Application Priority Data

Dec. 14, 1976 [FR] France ............................... 76 37624

[51] Int. Cl.² .............................................. C04B 35/26
[52] U.S. Cl. ............................... 252/62.59; 252/62.56; 252/62.61; 252/62.62
[58] Field of Search ............... 252/62.59, 62.61, 62.62, 252/62.56

[56] References Cited

U.S. PATENT DOCUMENTS

| 3,483,126 | 12/1969 | Sara et al. | 252/62.61 X |
| 3,630,912 | 12/1971 | Argentina et al. | 252/62.61 X |
| 3,640,867 | 2/1972 | Imura et al. | 252/62.62 X |

FOREIGN PATENT DOCUMENTS 2269506  11/1975  France.

Primary Examiner—Jack Cooper
Attorney, Agent, or Firm—Oblon, Fisher, Spivak, McClelland & Maier

[57] ABSTRACT

A soft ferrite having an initial permeability of around 1000, which can be operated at frequencies of less than 100 Kc/s and which have a resistivity of the order of 1 megohm-cm. The starting point of the manufacturing process is a mixture of the formula:

$$0.25 (1+t-z) \text{Li}_2\text{CO}_3; z \text{ZnO}; t \text{TiO}_2; 0.25 (5-3t-z-5\epsilon)\text{Fe}_2\text{O}_3$$

where:
$0.5 \leq z \leq 0.65$
$0.05 \leq t \leq 0.20$
$0.06 \leq \epsilon \leq 0.09$ The mixture furthermore contains traces of $\text{MnCO}_3$ and $\text{Bi}_2\text{O}_3$. The mixture is crushed, calcined in an air atmosphere at 800° C. and then sintered in an oxygen atmosphere at a temperature between 950° and 1050° C.

5 Claims, 1 Drawing Figure

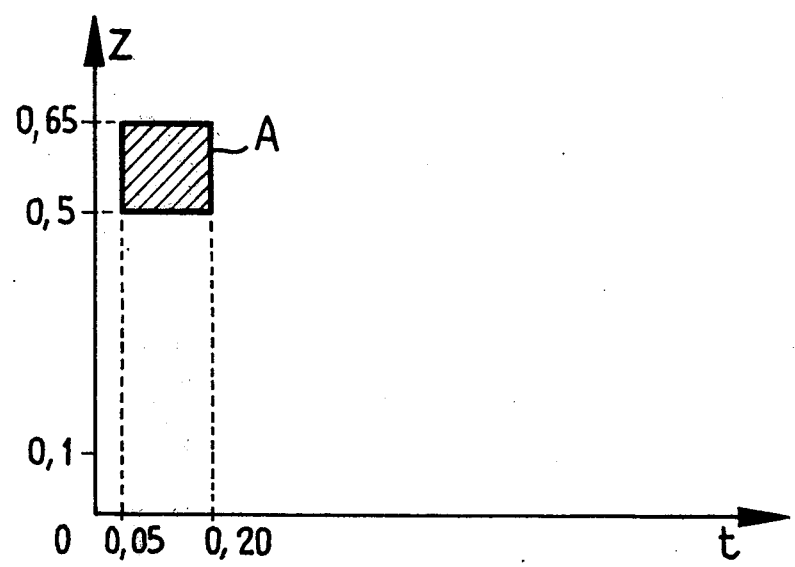

SOFT LITHIUM-TITANIUM-ZINC FERRITE

The present invention relates to soft ferrites whose magnetic properties are characterised by a high initial permeability, a high saturation induction and a very small coercive field strength. These materials are particularly useful for industrial applications in the context of low-frequency (especially frequencies below 100 Kc/s) electronics.

The materials currently used for this kind of application are for the major part manganese-zinc ferrites and to a lesser extent magnesium and magnesium zinc ferrites.

Soft manganese-zinc ferrites obtained by sintering operations carried out at a temperature of 1200° to 1300° C., must have a very accurate ferrous iron content requiring a very elaborate manufacturing technology. Their resistivity is low (although higher than that of soft iron) being of the order of 100 ohm-cm; and this gives rise to substantial electrical power losses due to the development of Foucault current and the Joule effect. Devices having applications such as transformer cores and deflection yokes in television receivers, must be electrically insulated, for example by appropriate treatment of the coil wires, and this constitutes a drawback due to the additional cost of such a treatment.

Lithium ferrites and lithium-zinc ferrites having a high Curie point, have a relatively low permeability and a resistivity of the order of 100 ohm-cm.

Ferrites suitable for such devices, whilst exhibiting the properties which characterise soft ferrites must have a resistivity of the order of $10^6$ ohm-cm, plus a high Curie point.

According to the invention, there is provided a soft lithium-titanium-zinc ferrite manufactured by a conventional method of preparing polycrystalline materials, from a mixture of oxides and carbonates, the steps involving crushing with the help of steel balls in a steel vessel, calcining at 800° C. for around two hours and sintering for between 6 and 24 hours between 950° and 1050° C. in an oxidising atmosphere, said mixture being defined as follows:

$$0.25(1+t-z)Li_2CO_3; zZnO; tTiO_2;$$
$$0.25(5-3t-z-5\epsilon)Fe_2O_3; mMnCO_3; 0.5bBi_2O_3;$$

where:
$0.5 \leq z \leq 0.65$
$0.05 \leq t \leq 0.20$
$0.06 \leq \epsilon \leq 0.09$
$0 < m < 0.05$
$0.0002 < b < 0.02$ For example, the manufacturing method comprises the following steps:

a. the mixture, in the presence of distilled water or alcohol of high-purity oxides and carbonates (purity better than 99.9%) in quantities corresponding to the chosen formula;

b. a first crushing of said mixture for around 24 hours in steel vessels containing steel balls;

c. stove-drying followed by calcining in a kiln (possibly a tunnel kiln) in a normal (air) atmosphere, the temperature being maintained for two hours between 800° and 850° C., while increase and decrease in temperature are performed at the rate of 60° C. per hour;

d. a second crushing of the resultant product in an aqueous or alcoholic environment, under conditions identical to those pertaining to the first crushing operation, for a duration of 36 to 48 hours;

e. drying and screening of the powder thus obtained;

f. shaping of the powder by pressing at a pressure of around 1 tonne/cm², in a steel mould, this requiring the prior incorporation of a binder (which must subsequently be driven off by heating to 600° C.);

g. sintering under an oxygen atmosphere, at a temperature of 950° to 1050° C. (depending upon the initial content of Bi in the mixture) for a period ranging between 6 and 24 hours).

The value of $\epsilon$ is chosen taking into account the quantity of iron drawn from the steel crushing tools; it is therefore adjusted as a function of the duration of the crushing stages.

The value of m is determined by trial and error as a function of other parameters of the composition. Its value is critical to avoid the occurrence of ferrous iron in the final material in order thus to contribute to the high value of the material's resistivity.

The value of b is determined as a function of the sintering temperature it makes it possible to operate at a lower temperature and, consequently, to reduce the quantity of lithium which is lost during this step by evaporation.

The invention will be better understood from a consideration of the ensuing examples and the accompanying drawing which is a graph showing the composition of the material.

In the single FIGURE, a graph has been plotted on a system of rectangular coordinates:

the abscissae plot the proportion t of $TiO_2$ (in moles in the mixture of oxides and carbonates used to manufacture the ferrite in accordance with the invention;

the ordinates plot the proportion z in ZnO (in moles) in the mixture.

A material in accordance with the invention is obtained if the following conditions are satisfied, as hereinbefore stated:
$0.05 \leq t \leq 0.2$
$0.5 \leq z \leq 0.65$ The limiting value define the approximate limits of the graphic area "A" of the invention (see the FIGURE) in relation to the quantities of titanium and zinc in the starting mixture. No account has been taken of the conditions determined for the contents of $MnCO_3$ and $Bi_2O_3$.

EXAMPLE 1

The parameters are fixed as follows:
z = 0.55
t = 0.10
m = 0.035
b = 0.0014
$\epsilon$ = 0.07
Calcining temperature: 800° C.
Duration of the 800° C. step: 2 hours
Temperatures and duration of the sintering step: 950° C. for 12 hours, then 975° C. for 12 hours, in an oxygen atmosphere.

The characteristics measured for the material, are given by the second column of Table I.

EXAMPLE 2

The parameters are as follows:
z = 0.6
t = 0.15 m=0.035
b=0.0014
ε=0.07

The calcining and sintering conditions are the same as in Example 1.

The characteristics of the material are given by the third column in Table I:

|  | Example 1 | Example 2 |
|---|---|---|
| Density | 4.84 | 4.84 |
| Magnetic moment $4\pi M_s$ | 3075 gauss | 2260 gauss |
| Curie temperature | 220° C. | 160° C. |
| Resistivity in ohm-cm | $2 \cdot 10^7$ | $3.5 \cdot 10^7$ |
| Permeability measured at 50 Kc/s | 736 | 1180 |
| Coercive fieldstrength | 0.28 Oe | 0.20 Oe |
| Ratio tg$\delta$ $\mu$ measured at 10 Kc/s | $123 \cdot 10^{-6}$ | $41 \cdot 10^{-6}$ |
| Temperature coefficient (from 25 to 55° C.) | $12.3 \cdot 10^{-6}$ | $1.7 \cdot 10^{-6}$ |
| Magnetic induction at 5 Oersteds at 25° C. | 2400 gauss | 1600 gauss |

OTHER EXAMPLES

By giving the parameters t and z values other than in the two preceding examples, with resistivities better than $10^6$ ohm-cm the following initial permeabilities are obtained, measured at 50 Kc/s:

450 for t=0.05 and z=0.5
1140 for t=0.1 and z=0.6.

From the foregoing examples it can be deduced that the magnetocrystalline anisotropy varies rapidly as a function of the zinc adn titanium contents. This observation partly explains the smallness of the area in which high-permeability ferrites are encountered.

The ferrites in accordance with the invention can advantageously be used, due to their very high resistivity and their high permeability, for the manufacture of transformer cores and deflection yokes in television receivers, their high Curie point lending these materials excellent temperature stability.

What we claim is:

1. A soft lithium-titanium-zinc ferrite characterized by a resistivity of greater than about $10^6$ ohm-cm, and an initial permeability of at least 450 measured at 50 kc/s, manufactured by forming a mixture of oxides and carbonates, crushing said mixture with the help of steel balls in a steel vessel, calcining the crushed mixture in an air atmosphere at 800° C. for about two hours and sintering the calcined mixture for between 6 and 24 hours between 950° and 1050° C. in an oxidizing atmosphere, said mixture being defined as follows:

$$0.25(1+t-z)Li_2CO_3; zZnO; tTiO_2;$$
$$0.25(5-3t-z-5\epsilon)Fe_2O_3; mMnCO_3; 0.5bBi_2O_3$$

where:
$0.5 \leq z \leq 0.65$
$0.05 \leq t \leq 0.20$
$0.06 \leq \epsilon \leq 0.09$
$0 < m < 0.05$
$0.0002 < b < 0.02$.

2. A ferrite as claimed in claim 1, wherein said mixture is defined as follows:
$0.1375Li_2CO_3$; $0.5ZnO$; $0.05TiO_2$; $1Fe_2O_3$; $0.035MnCO_3$ and $0.0007Bi_2O_3$.

3. A ferrite as claimed in claim 1, wherein said mixture is defined as follows:
$0.1375Li_2O_3$; $0.55ZnO$; $0.10TiO_2$; $0.95Fe_2O_3$; $0.035MnCO_3$ and $0.0007Bi_2O_3$.

4. A ferrite as claimed in claim 1, wherein said mixture is defined as follows:
$0.1375Li_2CO_3$; $0.6ZnO$; $0.15TiO_2$; $0.90Fe_2O_3$; $0.035MnCO_3$ and $0.0007Bi_2O_3$.

5. A ferrite as claimed in claim 1, wherein said mixture is defined as follows:
$0.125Li_2CO_3$; $0.6ZnO$; $0.1TiO_2$; $0.9375Fe_2O_3$; $0.035MnCO_3$ and $0.0007Bi_2O_3$.

* * * * *